United States Patent [19]

Ratte et al.

[11] Patent Number: 5,349,840

[45] Date of Patent: Sep. 27, 1994

[54] METHOD OF MAKING A HIGH TORQUE BATTERY TERMINAL

[75] Inventors: Robert W. Ratte, North Oaks; Ronald Cain, White Bear Lake; Norman E. Peterson, Wyoming, all of Minn.

[73] Assignee: Water Gremlin Company, White Bear Lake, Minn.

[21] Appl. No.: 16,370

[22] Filed: Feb. 11, 1993

Related U.S. Application Data

[63] Continuation-in-part of Ser. No. 940,391, Sep. 3, 1992, Pat. No. 5,296,317.

[51] Int. Cl.$^5$ ............... B21D 28/32; B21D 28/16; B21J 5/12
[52] U.S. Cl. ............................. 72/327; 72/357
[58] Field of Search ............... 72/327, 328, 333, 334, 72/357, 354.2

[56] References Cited

U.S. PATENT DOCUMENTS

| | | | |
|---|---|---|---|
| 1,983,618 | 12/1934 | Lamond | 72/328 |
| 2,599,706 | 6/1952 | Friedman | 72/327 |
| 3,096,579 | 7/1963 | Waller | 72/41 |
| 3,101,534 | 8/1963 | Lange | 72/361 |
| 3,113,892 | 12/1963 | Albrecht . | |
| 3,186,209 | 6/1965 | Friedman | 72/356 |
| 3,280,613 | 10/1966 | Schröm | 72/359 |
| 3,381,515 | 5/1968 | Orloff | 72/357 |
| 3,736,642 | 6/1973 | Miller et al. | 29/204 |
| 3,744,112 | 7/1973 | Lindenberg | 29/204 |
| 3,793,086 | 2/1974 | Badger | 136/134 |
| 3,835,686 | 9/1974 | Lawson et al. | 72/354 |
| 3,945,097 | 3/1976 | Daniels, Jr. et al. | 29/2 |
| 3,947,936 | 4/1976 | Wheadon | 29/2 |
| 4,041,755 | 8/1977 | Rut | 72/353 |
| 4,100,674 | 7/1978 | Tiegel | 29/623 |
| 4,146,771 | 3/1979 | Tiegel | 219/78.16 |
| 4,177,551 | 12/1979 | Johnson et al. | 29/623.1 |
| 4,291,568 | 9/1981 | Stifano | 72/356 |
| 4,352,283 | 10/1982 | Bailey | 72/354 |
| 4,406,146 | 9/1983 | Suzuki | 72/353 |
| 4,416,141 | 11/1983 | Nippert | 72/345 |
| 4,422,236 | 12/1983 | Ware, Jr. et al. | 29/876 |
| 4,423,617 | 1/1984 | Nippert | 72/356 |
| 4,580,431 | 4/1986 | Oku et al. | 72/334 |
| 4,662,205 | 5/1987 | Ratte | 72/359 |
| 4,776,197 | 10/1986 | Scott | 72/353 |
| 4,945,749 | 8/1990 | Walker et al. | 72/356 |

FOREIGN PATENT DOCUMENTS

| | | | |
|---|---|---|---|
| 0040951 | 2/1981 | European Pat. Off. . | |
| 0117213 | 8/1984 | European Pat. Off. . | |
| 0261311 | 3/1988 | European Pat. Off. . | |
| 523104 | 4/1931 | Fed. Rep. of Germany | 72/357 |
| 247036 | 10/1990 | Japan | 72/334 |
| 2141654 | 1/1985 | United Kingdom | 72/356 |

OTHER PUBLICATIONS

Gould Drawing No. 8RD5538, "Cold Forged Positive Lead Terminal Bushing For Plastic Covers", Gould Auto. Div., St. Paul, Minn., May 3, 1974.

Gould Drawing No. 8RD5539, "Cold Forged Negative Lead Terminal Bushing For Plastic Covers", Gould Auto. Div., St. Paul, Minn., May 3, 1974.

*Primary Examiner*—Daniel C. Crane
*Attorney, Agent, or Firm*—Jacobson & Johnson

[57] ABSTRACT

A battery terminal with high torque resistance utilizing three sided frusto-conical recesses and mating protrusions extending from the battery terminal and method of making the terminal by a cold forming process that forms a finished battery terminal from a preworked lead slug by driving one end of a punch through the slug to remove excess material and form an axial through hole, a second and third portion of the punch to close the die chamber and a fourth portion of the punch to radially expand the lead slug into a finished battery terminal. The dies for forming the battery terminal include a movable multiple-segmented die for collapsing radially inward around the slug and a frusto-conical die for forming the top portion of the battery terminal. An ejector sleeve removes the finished battery terminal after the cold forming process. A cylindrical punch with a transition zone that minimizes the local pressures in the die while elongated vent passages allow air to escape from the die to minimize formation of irregular terminals.

9 Claims, 8 Drawing Sheets

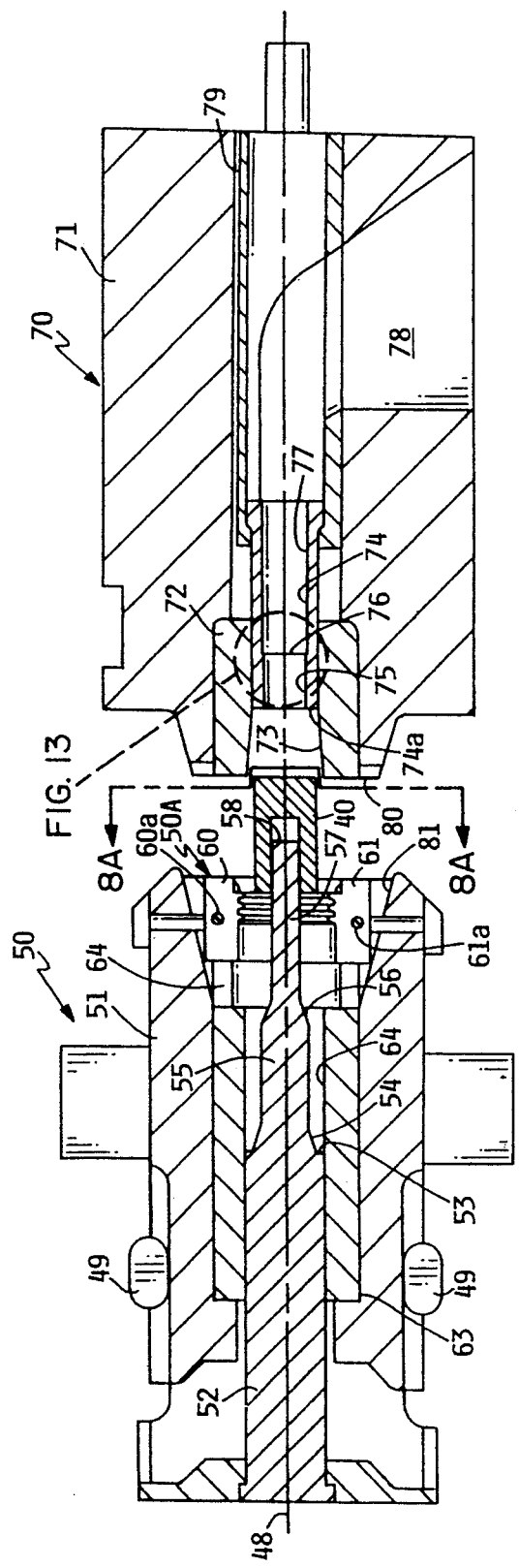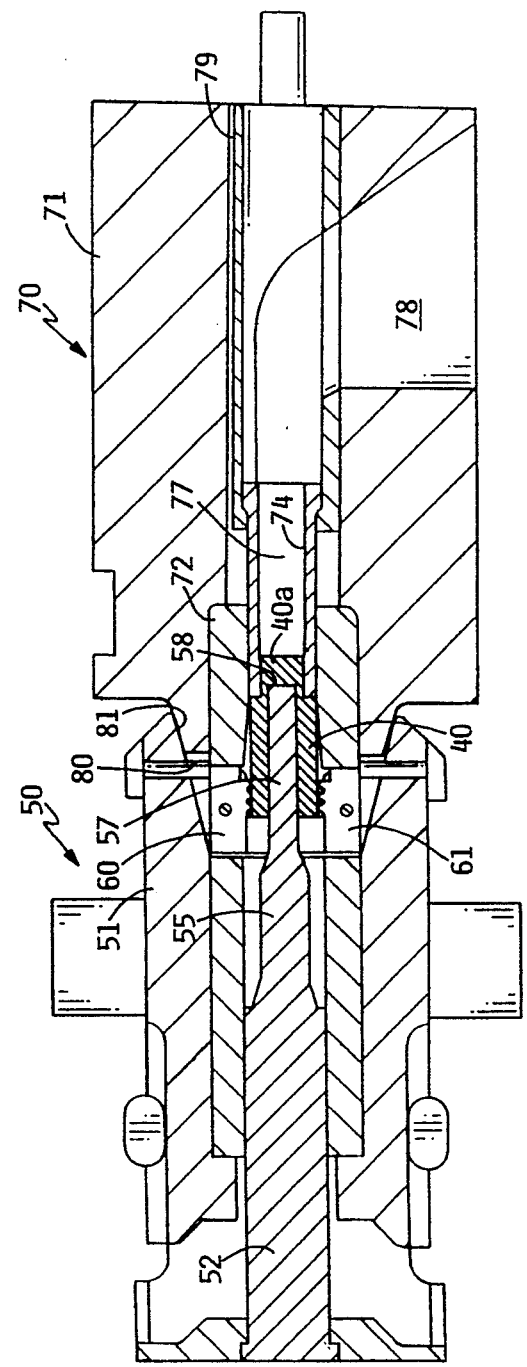
FIG. 8
FIG. 9

METHOD OF MAKING A HIGH TORQUE BATTERY TERMINAL

CROSS REFERENCE TO RELATED APPLICATIONS

This application is a continuation in part of our application Ser. No. 940,391 filed Sep. 3, 1992, now U.S. Pat. No. 5,296,317, issued Mar. 22, 1994 titled High Torque Battery Terminal and Method of Making Same.

FIELD OF THE INVENTION

This invention relates generally to battery terminals and an improved method of making battery terminals by cold forming. Our corresponding prior art application discloses cold forming battery terminals through the process of forming a lead slug into a cylindrical cup and then punching out the end of the lead slug while expanding the lead slug radially outward into a die having the shape of a finished battery terminal.

The present invention comprises improvements to the aforementioned process which reduces flash which may occur around the inside of the top of the battery terminal during the expansion process. While flash around the inside of the battery terminal does not normally require removal since molten lead is poured into the interior region inside of the battery terminal, it is preferred to make battery terminals as flash-free as possible since portions of the flash may flake off during handling and fall into the molten plastic used to form the battery cover.

The present process provides a method and means to virtually eliminate flash in the battery terminal through control of deformation pressures by venting trapped air and decreasing the expansion forces on the lead.

BACKGROUND OF THE INVENTION

The process of cold forming metals is well known in the art. Typically a deformable or malleable metal is deformed at room temperature through a series of compression and/or expansion steps. Cold forming has been used to form various articles including automotive items such as spark plug housings and battery terminals. Typically, spark plug housings are made of steel alloys and other articles, including battery terminals, are made of softer metals such as lead or lead alloys. While cast battery terminals have been used satisfactorily, cold formed battery terminals may be preferable since the working of the metals during the cold forming process appears to remove air pockets. The result is a more dense terminal that hinders electrolyte from escaping through the terminal. Although lead can be cold formed quite readily the leak-proof sealing of lead terminals to battery containers after the terminal has been formed is difficult since the battery terminal also needs to have a leak-proof seal between the terminal and the battery wall. Sealants have now been developed that enable battery manufactures to seal cold formed battery terminals to the battery container in a leakproof relationship.

One of the first cold formed battery terminals that was commercially available is shown in the Gould Inc. drawings dated 1974. The product was made and sold by applicant's assignee Water Gremlin Company to Gould Inc. in 1974.

Another commercially available battery terminal made and sold by applicant's assignee Water Gremlin Company is shown in the U.S. Pat. No. 4,662,205 which shows the cold forming of a finished battery terminal for a starved lead acid battery used as back up power source for an emergency lighting system. The U.S. Pat. No. 4,662,205 shows a machine for cold casting battery electrodes through use of end punches. In this process, a slug is cut off by machine and automatically fed into a chamber where the opposite ends of the slug are compressed between opposing punches to form a battery terminal. The U.S. Pat. No. 4,776,197 shows a method for forming a semi-finished battery terminal through a cold-forging process where the cylindrical slug is also compressed from opposite ends and subsequently finished to remove the unfinished ends of the battery terminal slug.

The present invention comprises an improved battery terminal that has high torque resistance to help prevent the terminal from coming loose from the container. In addition the present invention provides a process for cold forming a lead slug into a finished battery terminal that can be directly inserted into a battery container.

DESCRIPTION OF THE PRIOR ART

U.S. Pat. No. 4,580,431 shows a method and apparatus for cold forming a stepped article such as a gear blank U.S. Pat. No. 4,352,283 shows a six stage method for cold forming a hollow spark plug body.

U.S. Pat. No. 4,291,568 shows a method of cold working an alloy steel to produce a socket wrench.

U.S. Pat. No. 3,186,209 shows a method of cold forming metal to form a hollow metal body such as a spark plug shell.

U.S. Pat. No. 3,096,579 shows a method of cold forming metal to produce accurately shaped and hollow metal articles.

U.S. Pat. No. 3,835,686 shows a method of cold forming a steel slug to a hollow shank with a head for use as a roller clutch sleeve.

U.S. Pat. No. 3,280,613 shows a method of cold processing metal such as a steel slug to produce a spark-plug housing.

U.S. Pat. No. 3,101,534 shows a method of cold forming steel or the like to produce wrist pins or similar articles.

U.S. Pat. No. 4,416,141 shows a method of cold forming a ductile metal such as copper.

U.S. Pat. No. 4,423,617 shows a method of cold forming a welding electrode.

U.S. Pat. No. 3,793,086 shows a method of producing liquid-tight through the partition battery intercell electrical connectors through pressure welding.

U.S. Pat. No. 3,113,892 shows a battery terminal post and cover construction using a heat-resistant bushing to protect the thermoplastic battery cover during the filling of the terminal with molten lead. The battery terminal includes lugs to interlock with the container.

U.S. Pat. No. 3,744,112 shows a machine for the manufacture of subassemblies for storage batteries.

U.S. Pat. No. 4,100,674 shows a method of connecting battery terminals to battery lugs through use of resistance welding.

U.S. Pat. No. 3,945,097 shows a method and apparatus for making expanded lead grids from strips of expanded lead.

U.S. Pat. No. 3,947,936 shows a process for coining (cold forming) cast lead grids to remove the sharp edges and extend the life of the grid.

U.S. Pat. No. 4,146,771 shows an electrical welding apparatus for making integral and homogeneous connections between a terminal and a battery lug.

U.S. Pat. No. 4,177,551 shows a method of forming a through-the-partition intercell connection between adjacent cell groups and a multicell lead acid battery by arc welding the two units together.

U.S. Pat. No. 3,736,642 shows an apparatus for squeezing the intercell connections in a battery to form the connectors into an electrical connection.

U.S. Pat. No. 4,406,146 shows a die for cold forging internal tapered grooves for use on items such as sockets that are interacting for constant velocity joints of a universal joint.

U.S. Pat. No. 4,041,755 shows a method for forging single crank throw elements for a high powered engine.

European patent 040,951 shows an alloy which is useful in the manufacture of cold worked lead acid storage battery components, in particular grids.

British patent specification 1,245,255 shows a method of making a flange on a bushing to prevent leakage of electrolyte from the battery.

Russian patent 774,752 shows a machine for upsetting and cold forming opposite ends of a rod.

Russian patent 776,731 shows a machine for stamping metal articles.

U.S. Pat. No. 4,177,665 shows a process for cold forming articles from slugs.

U.S. Pat. No. 4,166,373 shows a method of cold forming an article to produce a socket-like member.

European patent application 0,117,213 shows a process of cold forming a work piece to simultaneously extrude the skirt and boss.

U.K. patent application 2,141,654 A shows a method of forming a spark plug shell through a cold extrusion process.

The drawing dated May 3, 1974 shows a 1974 commercially available cold formed battery terminal made through the cold-forming process.

U.S. Pat. No. 4,422,236 shows an extrusion process for making a lead or lead alloy battery terminal by forging the material around an object such as a screw or the like.

U.S. Pat. No. 4,662,205 shows a machine for cold casting battery electrodes through use of end punches. In this process, a slug is cut off by machine and automatically fed into a chamber where the opposite ends of the slug is compressed to form a battery terminal.

U.S. Pat. No. 4,776,197 shows a method for forming a semi-finished battery terminal through a cold-forging process where a cylindrical slug is deformed from opposite ends and subsequently finished to remove the two ends of the semi-finished battery terminal.

EPC patent application 261,311 is similar to the U.S. Pat. No. 4,776,197 and shows a method for forming a semi-finished battery terminal through a cold-forging process where a cylindrical slug is deformed from opposite ends and subsequently finished to remove the two ends of the semi-finished battery terminal.

EPC patent application 40951 discloses cold working battery components such as terminals and grids.

U.S. Pat. No. 4,945,749 shows a method for cold forming a metallic bushing for a battery terminal.

BRIEF DESCRIPTION OF THE DRAWING

FIG. 8 is a cross-sectional view of a movable die case and a coacting stationary die case for cold forming the slug into a battery terminal with the dies located in the open position;

FIG. 9 is a view of the movable die case and the coacting stationary die case of FIG. 8 in a partially closed position;

SUMMARY OF THE INVENTION

The invention produces a battery terminal with high torque resistance utilizing three sided frusto-conical terminal recesses that coact with mating protrusions extending from the battery container. The method is a horizontal cold forming process to form a finished battery terminal from a preworked lead slug by driving one end of a punch through the slug so that the one end forms an axial opening through the slug and removes excess material, a first and second portion of the punch closes the die chamber and a third portion of the punch radially expands the lead slug into a completed or finished battery terminal. The dies for forming the battery terminal include a movable four-segmented die for collapsing radially inward around the slug and a frusto-conical die for forming the top portion of the battery terminal. An ejector sleeve removes the finished battery terminal after the cold forming process is completed.

DESCRIPTION OF THE PREFERRED EMBODIMENT

Figure 1:
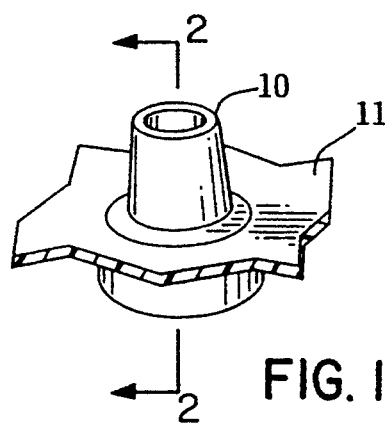
FIG. 1 shows a perspective view of a battery terminal inserted in a battery cover.
Figure 2:
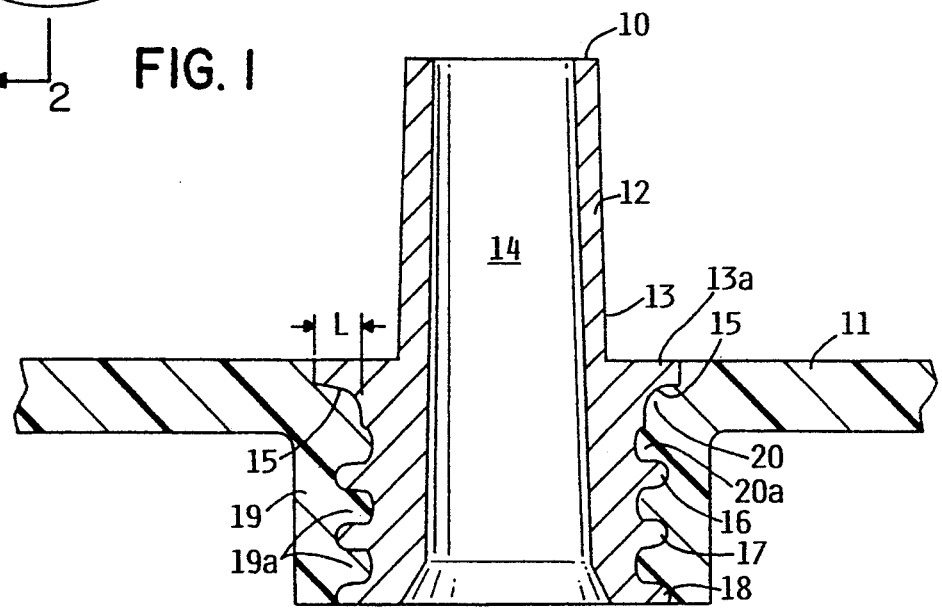
FIG. 2 is a cross-sectional view taken along lines 2—2 of FIG. 1.

In FIG. 1, reference numeral 10, generally identifies a cold formed high torque lead battery terminal as it appears in a thermoplastic battery container 11. FIG. 2 shows terminal 10 with a central or axial through passageway or opening 14 which will be subsequently filled with molten lead to form a mechanical and electrical connection to a battery grid within the battery container.

Figure 3:
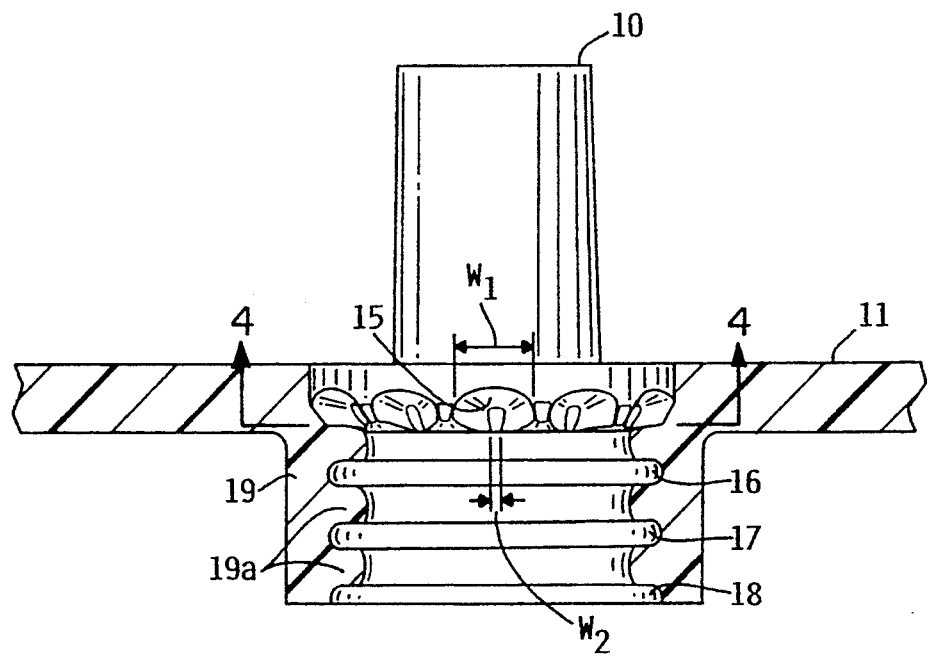
FIG. 3 is a view taken along lines 2—2 of FIG. 1 with the battery terminal not shown in section.
Figure 4:
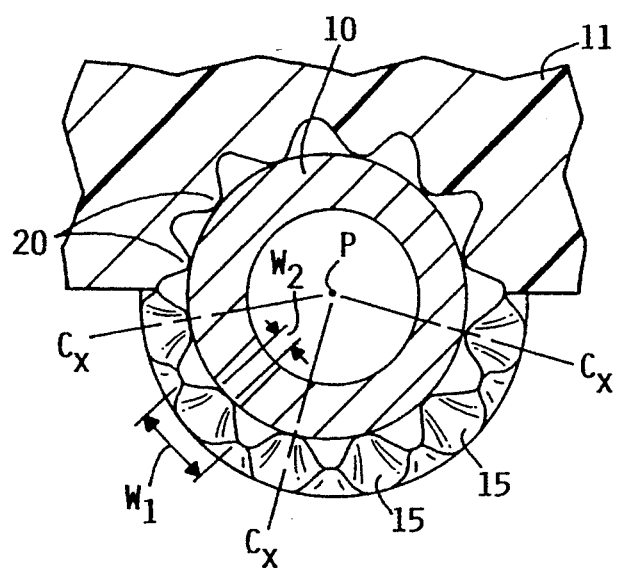
FIG. 4 is a cross-sectional view taken along lines 4—4 of FIG. 3.

FIG. 2, FIG. 3 and FIG. 4 show battery terminal 10 integrally formed or secured to battery container 11 in a torque resistant relationship by the coaction of terminal torque lock regions 15 and a moldable container material 19 such as a thermoplastic resin. Annular rings 19a of the container material 19 fill a set of annular openings located between parallel spaced acid-sealing rings 16, 17 and 18 which extend radially outward from terminal 10. Battery terminal 10 has a frusto-conical shaped hollow top portion 12 with an outer facing 13 for forming electrical connection with a battery connector. As viewed in FIG. 2 a protrusion member 20 has a massive base since the protrusion member extends vertically upward from annular cover member 20a that abuts against acid ring 16. The result is protrusion members 20 that are vertically restrained in container 11 by terminal ring 13a and acid ring 16.

FIG. 3 shows an end view of torque locks 15 that form a series of three sided general pyramid-like recesses 15 in the skirt of battery post 10. The recesses 15 are characterized in that they have a base dimension $W_1$ which is substantially larger than the top dimension $W_2$ so that the mating protrusions in battery container material 19, which fit into recesses 15, have a massive support base which tapers toward a narrower top.

FIG. 4 shows a sectional view taken along line 4—4 of FIG. 3 to illustrates how the battery container material, which forms three sided pyramid-like protrusions members 20, projects into torque locks 15 to thereby form circumferentially spaced retaining lugs for locking battery terminal 10 to container 11. Torque locks 15 are located circumferentially around terminal 10. Torque locks 15 are equal distance from one another with center lines $C_x$ extending through each of the torque locks to intersect at a central point P. The use of the torque locks 15 in battery terminal allows one to provide a substantially strong and rigid torque resistant support between battery terminal 10 and container 11. That is, tests have shown that by using torque locks 15 and three sided protrusions 20 extending from the molded container into the torque locks of a positive battery terminal produces such tenacious and integral connection between the container and the positive battery terminal that, in some cases, when the top portion 12 is subjected to a twisting high torque the top portion 12 of the battery terminal shears off before the terminal twists free of the container.

In the preferred embodiment the inward projecting members 20 are spaced circumferentially around the periphery of the battery terminal 10 and project inward. Twelve three sided projecting members 20 are located around the periphery of battery terminal 10 to integrally engage twelve torque locks on terminal 10.

Figure 5:
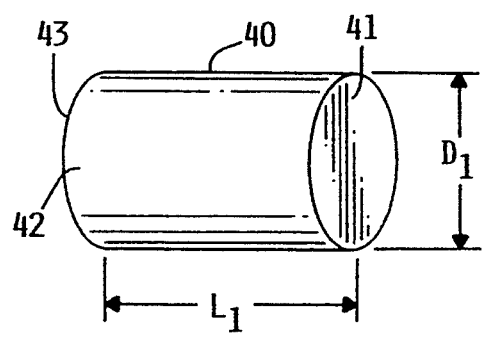
FIG. 5 shows a cylindrical metal slug for use to cold form into a battery terminal in accord with teaching of this invention.

The terminal 10 is readily adaptable to forming through a horizontal cold forming process that converts an extruded lead slug into a finished battery terminal for mounting in a battery container. FIG. 5 shows a cylindrical lead slug 40 formed through a conventional extrusion process. Lead slug 40 has a cylindrical outer surface 42, a first end 43 and a second end 41. The diameter of the slug is designated by $D_1$ and the length of the slug is designated by $L_1$. Prior to forming slug 40 into a finished battery terminal the slug is worked and shaped to square up the ends and the diameter of the slug so that the cold forming of the battery terminal can be performed in a single cold forming operation. In addition the pre-working of the lead is desirable since the lead cold forms better if the lead has been pre-worked.

Figure 6:
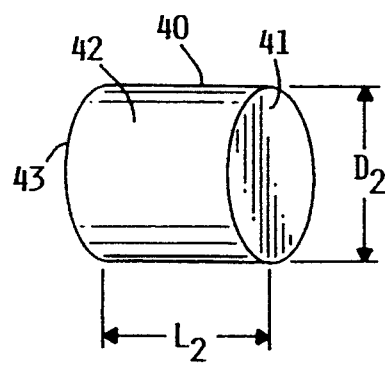
FIG. 6 shows the cylindrical slug of FIG. 5 after its faces have been squared off.

FIG. 6 shows lead slug 40 after further partial pre-working. Slug end faces 41 and 43 have been squared while the diameter $D_2$ remains substantially the same as diameter $D_1$. As a result of the end squaring process, the length $L_2$ of slug 30 may be slightly shorter than the length $L_1$ of the slug prior to the pre-working step.

Figure 7:
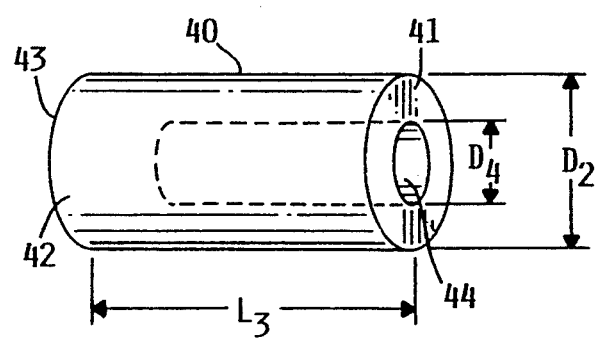
FIG. 7 shows the cylindrical slug of FIG. 6 with a cylindrical cavity or recess formed at one end.

FIG. 7 shows the cylindrical lead slug 40 after the final pre-working step that produces a slug for cold forming. During the final preworking step a cylindrical punch has been directed into a central portion of end 41 of slug 40 to produce a cylindrical cavity 44 that extends about half the depth of the lead slug with a diameter $D_4$. In this step, slug 40 increases in length because the punch forces the lead in the central portion of the slug to flow onto the end of the slug as the lead slug is confined by a cylindrical chamber (not shown) of diameter $D_2$. After the final pre-working step slug 40 has an outer diameter of diameter $D_2$ and a cavity of diameter $D_4$. After the final preworking steps the slug is now ready for cold forming into a finished battery terminal. As pointed out the purpose of the preworking of the lead slug is to prepare the metal for cold forming since preworked metal is easier to cold form. In addition the cold forming produces suitable dimensions on the lead slug to permit the cold forming process through coaction of a die and punch. While slug 40 is shown with a cavity 44 that extends about half way into slug 40, the cavity 44 may be formed in different depths. In certain applications, cavity 44 could extend completely through the lead slug and in other applications lead slug 40 can be processed without any cavity.

Figure 8A:
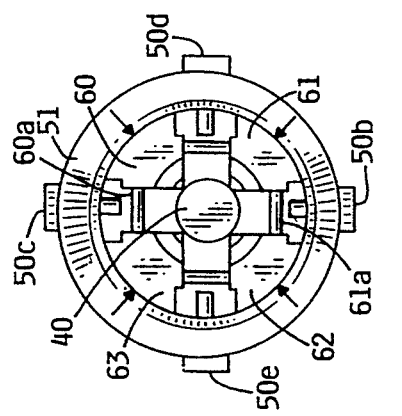
FIG. 8A is a view of the movable die case taken along line 8A—8A of FIG. 8.

FIGS. 8 through 12 show the process of forming the pre-worked cylindrical lead slug 40 into a battery terminal in greater detail. Reference numeral 50 identifies a movable die case and reference numeral 70 identifies a stationary die case. Reference numeral 49 identifies upper and lower members for moving movable die case along central axis 48. Preworked lead slug 40 is shown located on end 57 of a punch 52 which includes numerous cylindrical stepped sections as well as frusto-conical connecting regions. Punch 52 includes a cylindrical end face 53, a frusto-conical connecting region 54, a cylindrical section 55, a further frusto-conical connecting region 56, a cylindrical section 57 having an end surface 58. The diameter of section 57 is slightly more than the diameter $D_4$ so that lead slug 40 is maintained on punch section 57 through frictional engagement between slug 40 and punch section 57. Punch 52 is powered by a source (not shown) and slides within a sleeve 63 which sliding supports a four-part radially collapsible die section 50a which is axially displaceable in die case 50. Quadrant segments 60 and 61 of die section 50a are shown in FIG. 8. FIG. 8A shows an end view of movable die 50 to illustrate all four segments 60, 61, 62 and 63. Die segments 60, 61, 62 and 63 slide on frusto conical surface 64 to permit each of the die segments to be displaced axially and radially around lead slug 412). A set of radial pins 50c, 50d, 50b, and 50e extend inward to act as stops for the die segments, a set of cross pins 60a, 61a, 60b, and 61b act as lateral guides to permit the die segments to move radially inward while maintaining alignment with each other. The front of movable die case 50 contains a frusto conical guide surface 64 so that the die segments 60, 61, 62 and 63 can be collapsed around slug 40. While the die segments 60, 61, 62 and 63 can be collapsed around lead slug 40 the die segments 60, 61, 62 and 63 do not do any deforming of the lead slug 40 during the collapsing step. That is the die segments 60, 61, 62 and 63 collapse to form a die chamber having the shape of the lower portion of a battery terminal which contains the protrusions and recesses to form acid sealing rings 16, 17 and 18.

Figure 10:
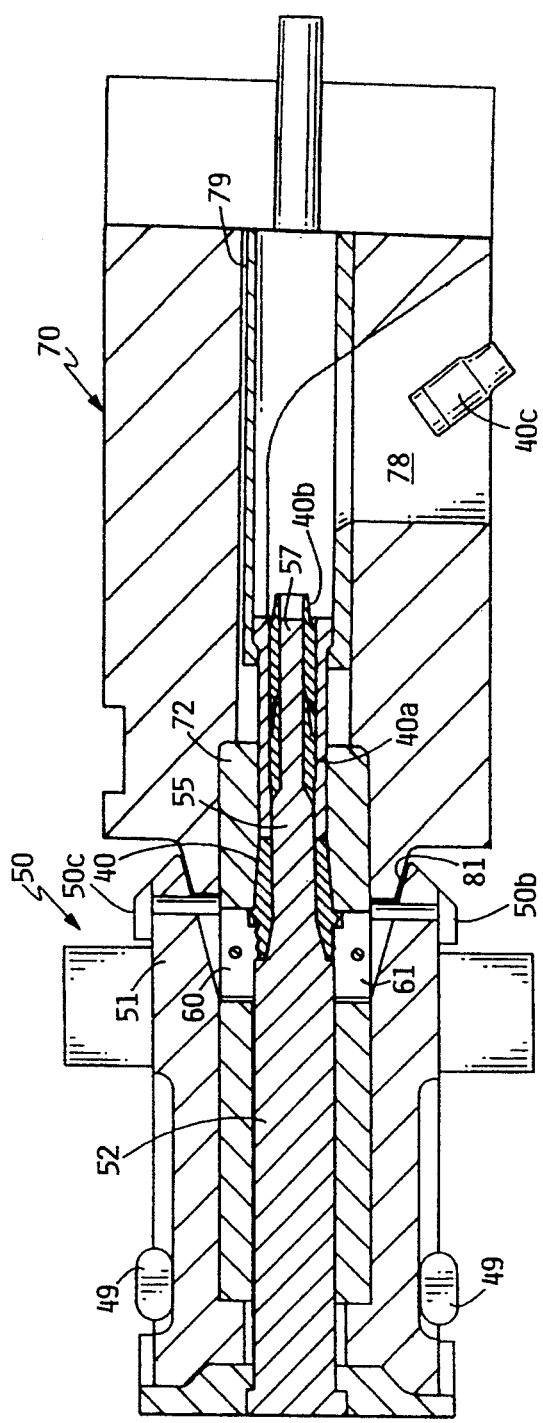
FIG. 10 is a view of the movable die case and the coacting stationary die case of FIG. 8 in a further closed position.

The companion to movable die case 50 is stationary die case 70, which includes an outer member 71 and a die 72 for forming the top portion 12 of a battery terminal. Die 72 contains a frusto-conical section 73 which forms the cavity 73 for forming the top portion of a battery terminal. An ejector sleeve 74 slides within die 72. Ejector sleeve 74 includes an end surface 74a, a first inner surface 75 and a second inner surface 77 of slightly larger diameter. A waste retaining lip 76 connects first inner surface 75 and second inner surface 77. Located to the fight of ejector sleeve 74 is a passage 78 for discharging lead removed during the cold working of the lead slug. The end of die 70 includes members 80 which abut against the closed four split die segments 60, 61, 62 and 63 when die 50 is moved axially against stationary die 70. FIGS. 9 and 10 illustrate the cooperative relationship of die 50 and die 70. FIG. 9 shows lead slug 40 confined in the die segments 60, 61, 62 and 63 and die section 72. An end of slug 40 is shown partially displaced by end 58 of punch section 57. Punch section 57 is completing the formation of a through hole in lead slug 40 by forcing a portion 40a of lead slug 40 through the interior of ejection sleeve 74. During this first through hole punching phase with cylindrical punch section 57 lead slug 40 is not radially expanded outward although the die segments 60, 61, 62 and 63 and die section 72 do not prevent radially outward deformation of lead slug 40.

FIG. 10 illustrates the cold forming process in a more advanced state with slug 40 radially deformed and separated from excess lead 40a. FIG. 10 shows that cylindrical punch section 55 has radially expanded the hollowed lead slug radially outward into die segments 60, 61, 62 and 63 and die section 72 to form a finished battery terminal. Waste lead 40a is located on the inside of ejector sleeve 74 and pushes waste lead slugs 40b located in ejector sleeve 74. In operation, waste lead 40c is pushed out of ejector sleeve 74 by waste lead 40a and waste lead 40b as shown in FIG. 10. Waste lead 40c falls out passage 78.

Figure 11:
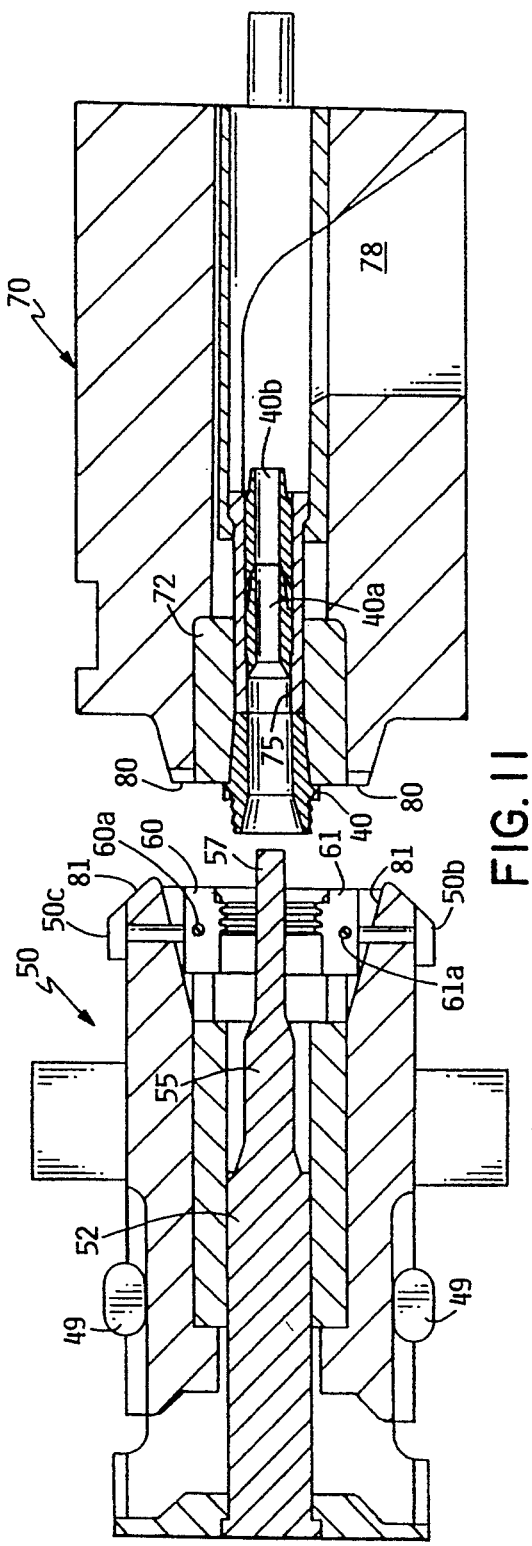
FIG. 11 shows the movable die case and the coacting stationary die case of FIG. 8 in an open position after formation of a battery terminal.

FIG. 11 illustrates movable die 50 in a retracted position with lead slug 40 formed into a finished battery terminal which is frictionally held by the sides of die section 72 of die 70.

Figure 12:
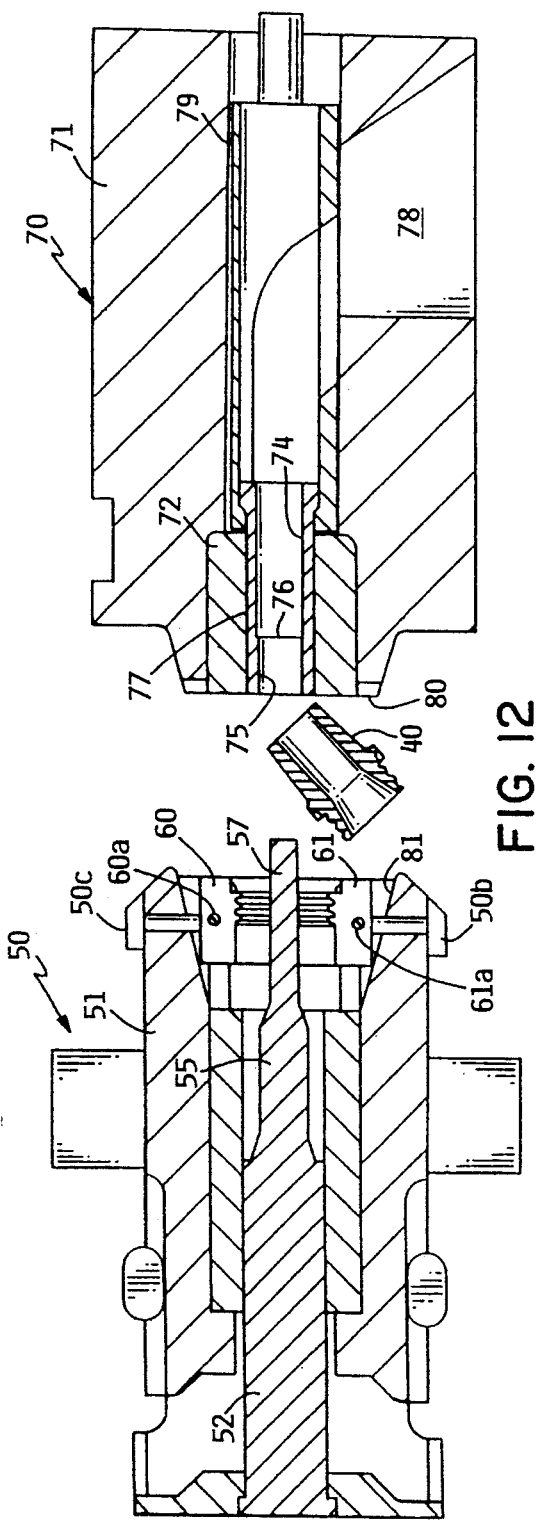
FIG. 12 shows the movable die case and the coacting stationary die case of FIG. 8 in the ejection position.

FIG. 12 illustrates ejector sleeve 74 forcing finished battery terminal 40 out of stationary die 70.

Thus, in the process of the present invention, a cylindrical cupped shaped lead slug is placed into a die and in a single operation a stepped punch forms a through opening in the lead slug, removes excess lead from the lead slug and radially deforms the remaining portion of the lead slug into a finished battery terminal ready for mounting into a battery container.

Figure 13:
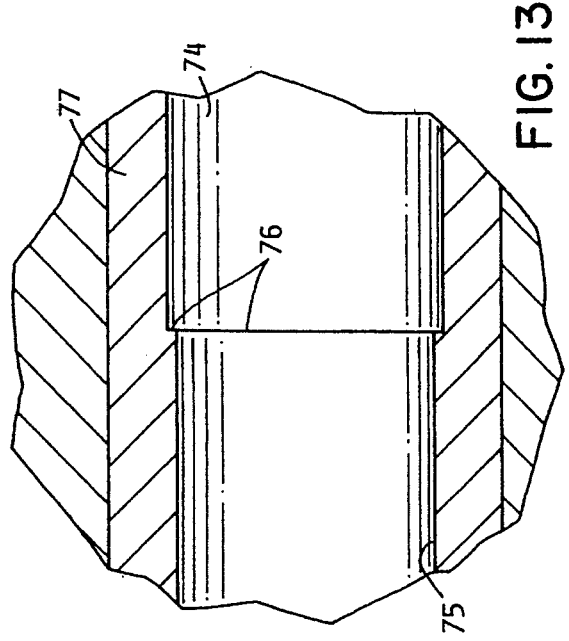
FIG. 13 shows an enlarged view of the retaining lip for removing waste lead.

To understand the operation of the removal of waste lead 40a with ejection sleeve 74, refer to FIG. 13 which is an enlarged view of interior cylindrical surfaces 74 and 75 which are connected by a cylindrical lip 76. The purpose of lip 76 is to provides a means for catching the waste lead 40a so that as pin 57 is withdrawn from slug 40 lip 76 prevents waste slug 40a from being pulled back with punch 57.

Figure 14:
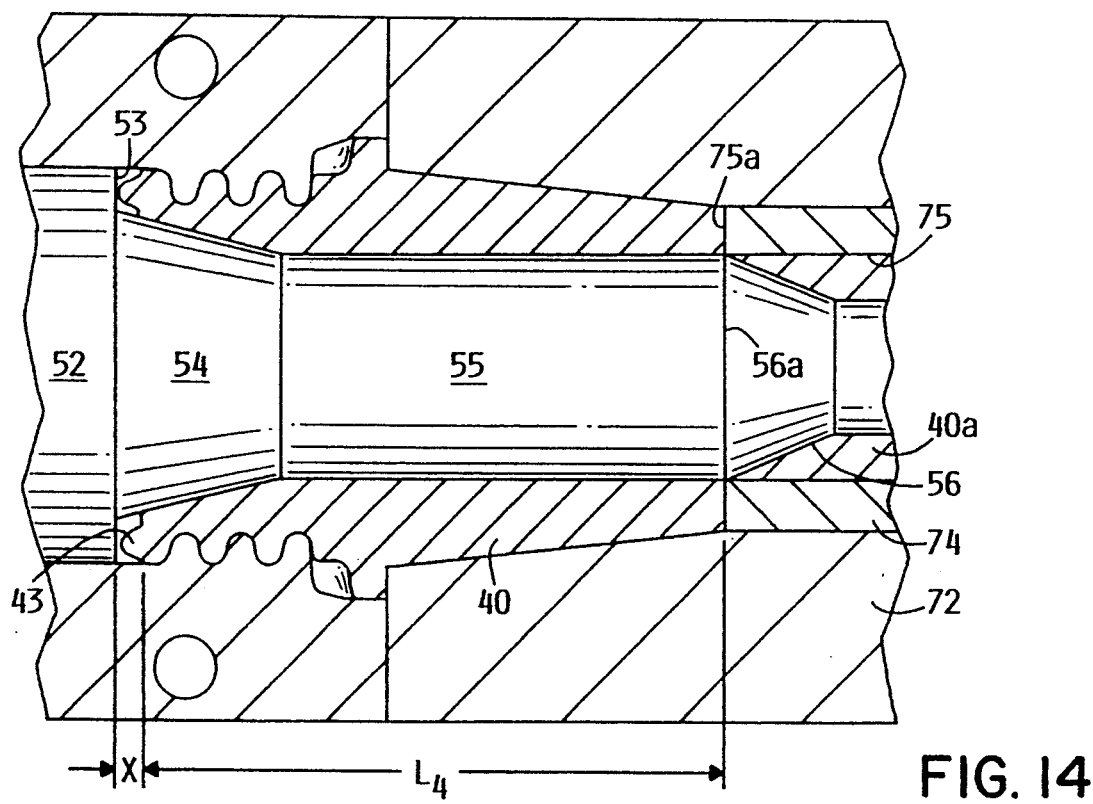
FIG. 14 shows an enlarged view of the lead slug prior to final deformation.
Figure 15:
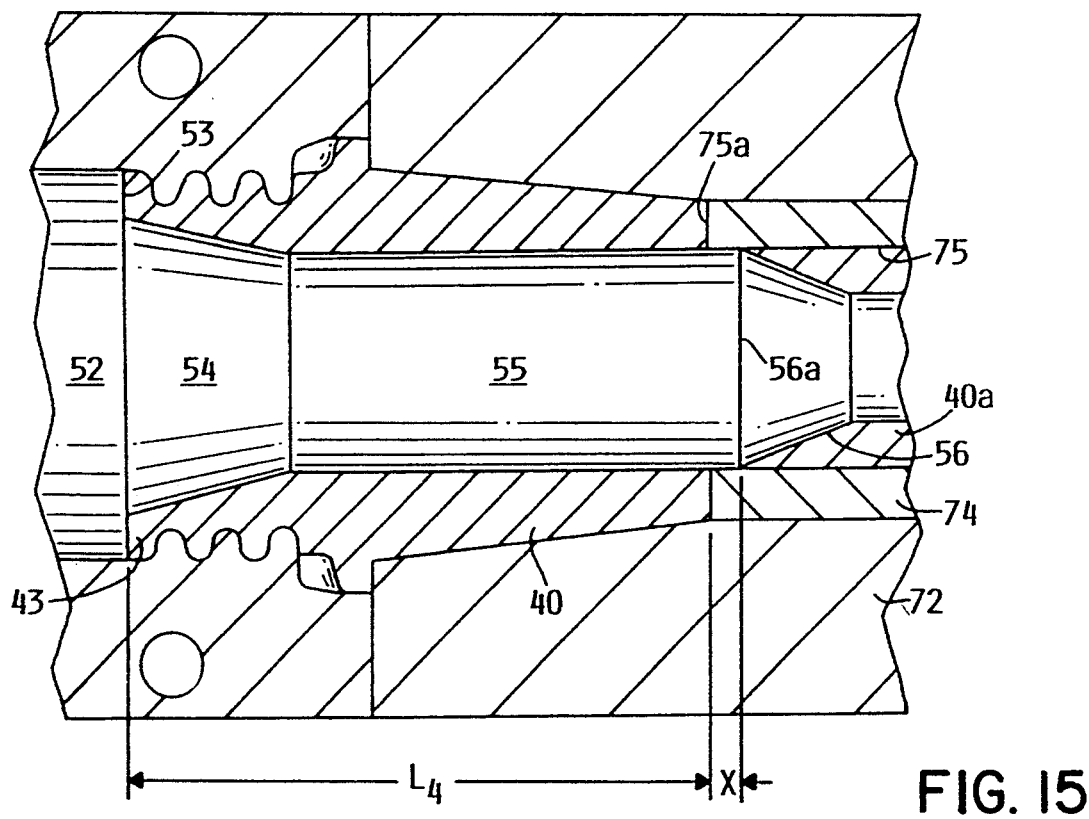
FIG. 15 shows the lead slug after final deformation just before the dies are opened.

During the cold forming process the punch and ejector sleeve coact so that the proper mount of lead remains within the dies during the final cold forming phase. FIG. 14 illustrate the final expansion of the lead slug as the first portion of cylindrical punch 55 seals off one end of the die chamber around lead slug 40. FIG. 14 shows an enlarged view of lead slug 40 at the moment the die chamber for forming the lead slug into a battery post or terminal is completely confined. The cylindrical punch surface 55 has an outside diameter that closely fits within the opening of ejector sleeve 74 to seal off one end of the die chamber for the lead slug. That is, when frusto conical base surface 56 (region 56a) engages the inner surface 75 of ejector 74 it completely seals off one end of the die chamber for lead slug 40 as well as shears waste lead 40a from slug 40. Similarly, punch face 53 completely seals off the opposite end of the die chamber. FIG. 14 shows that at the moment of beginning shear of the waste lead portion 40a, the base section 53 of punch pin 52 is spaced a distance x from the final position. That is, prior to the final expansion of lead slug 40 waste lead 40a is separated from lead slug 40 and the die chamber is sealed at both ends. Even though the die chamber around the lead slug is sealed off there is sufficient mount of punch pin travel left before the final radial expansion and deformation of lead slug 40 is completed. That is, the portion of lead slug 40 remaining in the chamber has in effect been measured for the proper mount of lead for the final compression phase. During the final compression phase punch face 53 may travel the complete or partial distance x to complete the final formation of the battery terminal. Since lead is relatively deformable but incompressible the pressure on the die dramatically increases when the lead fills the closed die chamber. To prevent breaking of the dies pressurized chambers with a compressible gas (not shown) are used to close segments 60, 61, 62, and 63 so that sufficient pressure can be applied to pin 52 to produce the final deformation of lead slug 40. Consequently, this ensures that sufficient pressure is applied to lead slug 40 to completely deform slug 40 into a finished battery terminal.

While the present process is shown with regard to a cylindrical slug that is formed into a cylindrical terminal the process is equally well suited for forming battery terminals with lateral extending members as shown in U.S. Pat. No. 4,662,205.

Figure 16:
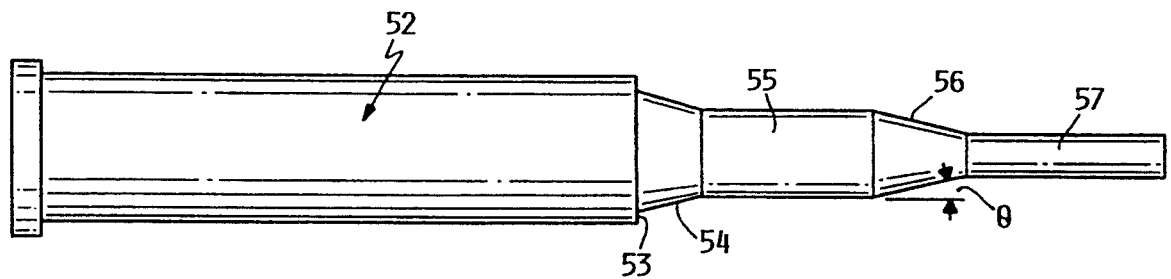
FIG. 16 is a side view of the punch of the present invention.

FIG. 16 reference numeral 52 identifies the improved step punch which is generally shown in FIGS. 8–12. At the front portion of punch 52 is a frusto-conical section 56 which forms a transition section between end cylindrical section 57 and the intermediate cylindrical section 55 of punch 52. It has been discovered that controlling the transition cone angle them on punch 52 generally reduces the flash present in the finished part.

Figure 18:
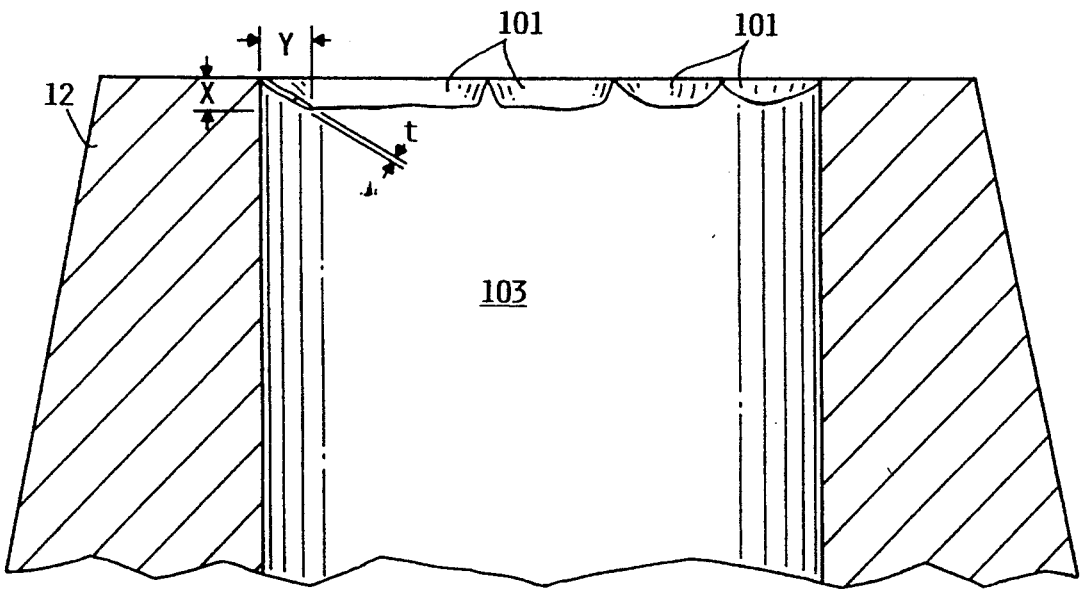
FIG. 18 is an enlarged sectional view showing a flash on a battery terminal.

To illustrate flash in a battery terminal, refer to FIG. 18 which shows an enlarged portion of the battery terminal 12 with flash 101 extending outward from the inside corner of terminal 12. Typically, flash 101 comprises a thin section of extruded metal which extends radially inward a distance y and downward a distance x. While the size of the flash may vary, the typical flash may have an x dimension of 0.005 Inches and a y dimension of 0.005 inches with a thickness z of 0.0001 inches. Since the internal region 103 is to be filled with lead, the presence of flash 101 in the interior region normally causes no problems. However, if the terminals are handled roughly, flash 101 may flake off and fall into the plastic used to mold the battery cover around the battery terminal, thereby creating the possibility for introducing a short in the battery.

The improvement in the process comprises a method and means for eliminating the flash. One of the known ways to eliminate flash is to have the exact amount of lead necessary to expand into die 130. Another is to have the lead positioned in the die so it uniformly fills the die during the cold forming process. Unfortunately, precisely controlling the amount of lead to fill up the die is difficult to do during a cold forming process.

Figure 17:
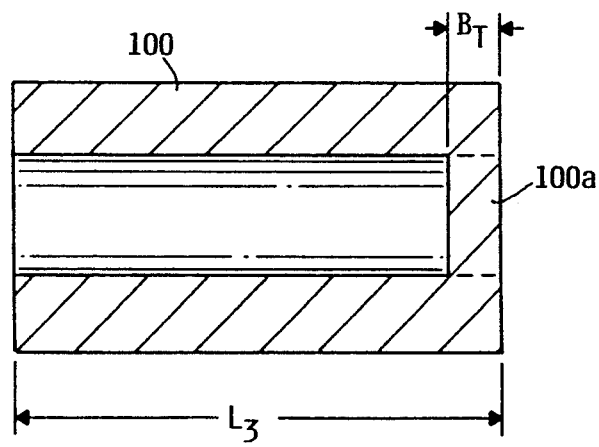
FIG. 17 is a cross sectional view of a lead slug cold formed in a shape of a cylindrical cup.
Figure 19:
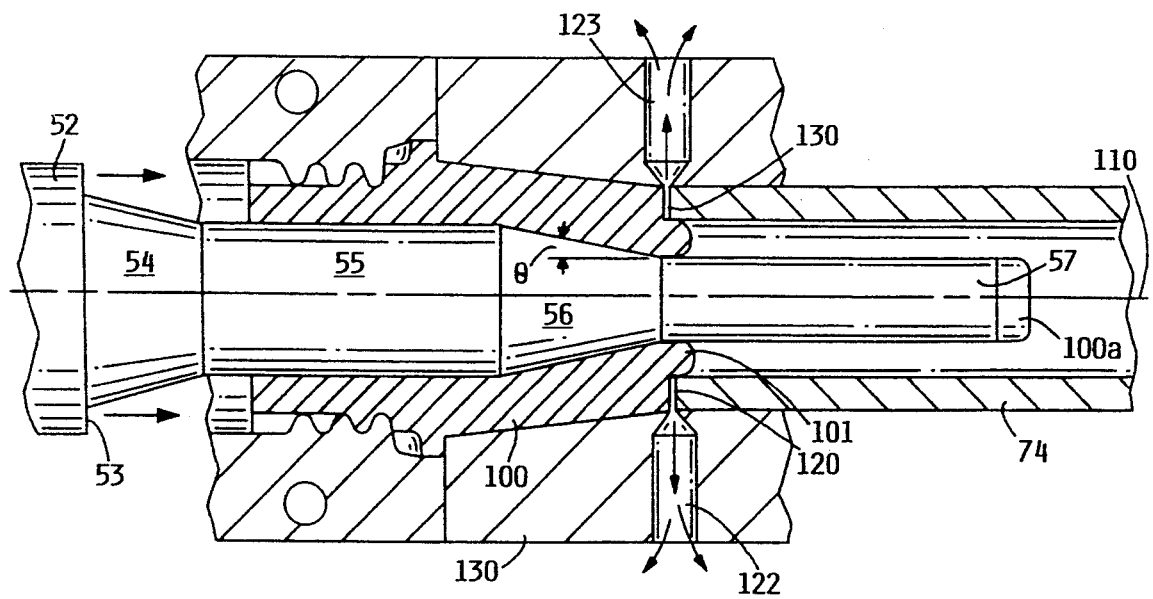
FIG. 19 is a cross sectional view illustrating transition zone forcing excess lead out of the die.

An alternate approach is to form a lead slug with a known mount of excess lead and then remove the excess lead during the cold forming process. In the present process, excess lead is removed in two steps. First, the end of the cylindrical lead slug is punched out and then the remaining excess lead is forced out in an annular shaped member extending around pin 52. It should be pointed out that slug 100 (FIG. 17) is shown having a bottom thickness designated by $b_t$. The purpose of having a cylindrical bottom 100a is to facilitate handling of the lead slug during the forming steps; that is, the bottom section 100a of slug 100 allows end of pin 57 to positively engage slug 100 and force the slug to seat against the end of sleeve 74 (FIG. 9 and 19). Once seated, the end 100a of slug 100 is removed as the end of pin 57 continues forward to remove the excess lead in the shape of a cylindrical plug 100a (FIG. 19). Thus, it is envisioned that if other means were used to seat slug 100 in the die, one could use an annular slug rather than a cylindrical cup-shaped slug for radial deformation of a battery terminal in die 130.

Figure 20:
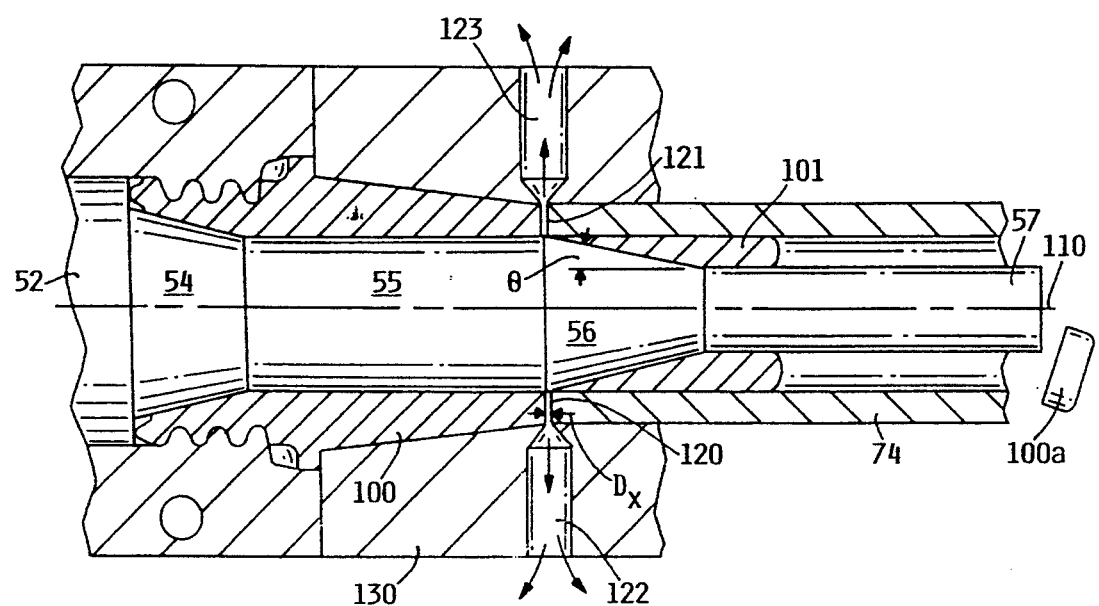
FIG. 20 is a cross sectional view showing the punch forcing excess lead from the die.

While flash is a problem in cold forming parts, one of the additional problems in closed cold deformation of a lead slug and particularly in high speed cold forming of parts is that air may not be completely purged from the die prior to dosing the die. Consequently, local irregular deformation of the cold formed part may occur. To alleviate the problem of local deformation due to trapped air, we provide peripheral spaced elongated die vent holes proximate the end of the die where excess material is forced out. FIG. 19 shows die 130 and multistep punch 52 coacting to radially expand lead slug 100 into a battery terminal. In FIG. 19, punch 52 is shown with a portion of the forward travel of the punch yet to be completed, and FIG. 20 shows punch 52 with the forward travel completed. FIG. 19 illustrates that during the radial expansion process, excess lead 101 extends in an annular shaped section 101 and is forced forward of section 56 as punch 52 moves forward.

Located peripherally around die 130 are a series of narrow, elongated vent passages 120 and 121. Vent passage 121 connects to a larger discharge passage 123, and vent passage 120 connects to a larger discharge passage 122. The vent passages are narrow to allow air to escape and are placed at the end of the die to prevent the vent passage from acting as a die cavity. Typically, vent passages 120 and 121 may have a width of up to 0.125-inches but have a depth $d_x$ of only about 0.0005-inches. The small depth vent passages allow air to escape and thus avoid local deformation as a result of air trapped within the die. While only two vent passages are shown, one may prefer to radially space more or less vent passages. Typically, four to six vent passages radially spaced around die 130 provide means for removing trapped air from the die.

FIG. 19 illustrates another feature of the process. Note, end plug 100a located on the end of pin 57. End plug 100a was forced out of the bottom of slug 100 (FIG. 17) to provide an annular slug 100 for radially expansion within die 130. Due to the rapid forward motion (indicated by arrows) of pin 52, end plug 100a is forced outward of ejector sleeve 74 and drops off the end of pin 57 (FIG. 20) as pin 52 reaches the end of its forward travel. Thus, a first portion of excess lead 100a is removed from slug 100 by pin 57 with a shearing or punching process. The second portion of excess lead removed from slug 100 comprises annular lead member 101 (FIG. 19) which is being formed around transition section 56 as lead is being forced radially outward and forward in front of section 56. As punch 52 continues its forward journey, annular waste lead member 101 is sheared from the end of slug 100 by co-action of punch section 55 with die 130 and the end of sleeve 74. Extending centrally through punch 52 is a central axis 110. Central axis 110 is concentric with die 130 and sleeve 74. FIG. 19 shows frusto-conical transition section 56 located between and smoothly connecting cylindrical pin sections 55 and 57 to each other. The transition zone 56 is maintained at an angle them which is less than 15 degrees. Preferably an 11 degree transition angle is preferred.

It has been discovered that the larger the angle them, the greater the pressure build-up in the die and the greater the chances for flash occurring during the cold forming of the terminal through a radial expansion process. On the other hand, the less the transition angle, the longer the transition zone 56. To avoid the transition zone from extending too far and consequently extending the required length of travel of pin 52, it is preferred to have the transition angle theta a minimum of about 8 degrees.

It has been found that with a transition zone 56 of about 11 degrees, the excess metal 101 is sheared from the end of terminal 101 without creating excess deformation forces that force metal in the form of a flash between the outside of a die section 55 and the interior sleeve 74. While the optimal transition zone angle may vary with different components, one can readily determine the proper angle by observing the finished part. If the finished part is not completely filled out, the transition angle may be too Shallow. Conversely, if the transition angle is too high, excessive deformation pressure is provided in the die forcing flash from parting surfaces between die 130 and sleeve 74.

We claim:
1. The process of cold forming a finished battery terminal by:
   preworking a lead slug until the lead slug forms a cup-shaped lead slug having a cavity therein;
   placing the cup-shaped lead slug having a central axis and the cavity with a bottom section on a punch having a dimension sufficiently large to form frictional engagement between the cup-shaped lead slug and the punch to maintain the cup-shaped lead slug on the punch during cold forming of the battery terminal;

forming a die chamber in the shape of a battery terminal by closing at least two die segments around the cup-shaped lead slug without deforming the cup-shaped lead slug;

first punching out the end of a cup-shaped lead slug having a first end and a second end by forcing the end of a punch through the cavity and the first end of the cup-shaped lead slug;

driving the punch through the first end of the cup-shaped lead slug to force excess lead from one end of the die chamber;

continuing to drive the punch through the first end of the cup-shaped lead slug until the excess lead is sheared from the first end of the cup-shaped lead slug;

forcing an expanding punch section into the cavity of the cup-shaped lead slug to radially expand the cup-shaped lead slug into the shape of a finished battery terminal formed by the die chamber;

separating the die segments around the cup-shaped lead slug so that the die segments are radially free of the external features of the finished battery terminal and axially withdrawing the die segments from around the finished battery terminal and ejecting the finished battery terminal and the excess lead sheared from the die chamber.

2. The process of claim 1 including the step of forming the finished battery terminal while the cup shaped cylindrical lead slug central axis is in a horizontal position.

3. The process of claim 1 including the step of closing the die chamber about the cup shaped lead slug with the punch by extending the punch through the die chamber to enable one region of the punch to seal one end of the die chamber and another region of the punch to seal the opposite end of the die chamber.

4. The process of cold forming a finished battery terminal by:

placing a lead slug having a first end and a second end between two dies;

forming a die chamber in the shape of a battery terminal around the lead slug by radially closing at least two die segments around the lead slug;

first punching out the first end of the lead slug by forcing the end of a punch through the end of the lead slug;

driving the end of the punch through the lead slug to force excess lead out of the die chamber;

continuing to drive the punch through the first end of the lead slug until the excess lead is sheared from the first end of the lead slug;

deforming the lead slug into the shape of a finished battery terminal defined by the die chamber;

separating the die segments around the lead slug so that the die chambers is free of the external features of the finished battery terminal; and ejecting the finished battery terminal from the die chamber.

5. The process of claim 4 including the step of pre-working the lead slug to form a cavity extending about half way into the lead slug.

6. The process of claim 4 including the step of radially expanding the lead slug to form the finished battery terminal.

7. The process of claim 4 including the step of forcing a portion of the lead slug outside of the die chamber with the punch and then shearing off the portion of the lead slug with the punch.

8. The process of claim 4 including the step of closing the die chamber with two different regions of the punch.

9. The process of cold forming a substantially flash free finished battery terminal by:

placing a lead slug having a first end and a second end between two dies;

forming a die chamber in the shape of a battery terminal around the lead slug by radially closing at least two die segments around the lead slug;

radially expanding the lead slug into the die chamber while forcing excess lead laterally forward in the die chamber by driving a punch with a transition zone through the lead slug with the transition zone forming an angle of about 11° to the central axis of the punch to thereby limit the radially expanding forces on the lead slug to below the force sufficient to form a flash on the lead slug by simultaneously forcing a portion of the lead radially and a further portion of lead laterally forward of the transition zone until the further portion is outside of the die chamber to thereby cold form a substantially flash free finished battery terminal.

* * * * *